Patented Nov. 17, 1953

2,659,707

UNITED STATES PATENT OFFICE 2,659,707

CURING AGENTS FOR CHLOROSULFONATED POLYETHYLENE

Orrin G. Youngquist, Malcolm A. Smook, and Richard E. Brooks, Wilmington, Del., assignors to E. I. du Pont de Nemours & Company, Wilmington, Del., a corporation of Delaware No Drawing. Application March 23, 1951, Serial No. 217,312

5 Claims. (Cl. 260—41)

This invention relates to a process for the preparation of synthetic elastomers from substituted saturated polymers and more particularly relates to the preparation of elastomers, to carbon black, for cross-linking saturated and substituted polymers to give elastomers, and especially to channel black for cross-linking the chlorosulfonated polymers of ethylene.

The McQueen U. S. Patent 2,212,786, issued August 27, 1940, describes a process for the preparation of chlorosulfonated olefin polymers and especially the chlorosulfonated products of normally solid polymers of ethylene. The process of the McQueen patent is applicable to the chlorosulfonation of other saturated polymers such as, for example, as polyisobutylene, Fischer-Tropsch hydrocarbons, the polymethylenes, the polyacrylonitriles and others. In the McAlevy et al. U. S. Patent 2,416,061, issued February 18, 1947, there is described a process of curing hydrocarbon and oxygenated hydrocarbon polymers which have been chlorosulfonated in accord with the process of the McQueen patent. The McAlevy et al. patent, in addition to the chlorosulfonation reaction, describes other reactions giving products that can be cured and thereby converted to elastomers. In order to produce such products the patentees state that polymers should carry at least two substituent groups. Those that impart (1) Elastic properties provided by:

A—Halogen,
B—Hydrocarbon and
C—Acyloxy groups;

(2) An those that make it possible to cure the product, provided by:

A—Sulphonating,
B—Phosphonating,
C—Carboxylating,
D—Chlorosulfonating,
E—Chlorophosphonating,
F—Chlorocarboxylating, and
G—Agents that give a hydrogen sulfide group.

The patentees describe as curing agents for these and equivalent products, polyvalent metal oxides and their hydroxides while in their related U. S. Patent 2,416,060 they describe, for the same purpose, polyvalent metal salts of acids having ionization constants of less than $1 \times 10^{-3}$.

To provide addition agents for the aforesaid and similar substituted saturated polymers, to provide cross-linking of saturated polymers containing substituents that impart elastic properties and substituents that impart curing ability to hydrocarbon polymers, to provide improved cross-linked chlorosulfonated solid polymers of ethylene and to provide as cross-linking agents forms of carbon black for treating compounds containing chloride and sulfonyl chloride groups, they are, inter alia, the objects of the invention.

The above and other objects are realized in accord with the invention by certain forms of carbon black used for curing and/or cross-linking saturated hydrocarbon polymers that have been substituted with halogen, hydrocarbon, or acyloxy groups and also have been substituted with sulphonating, phosphonating, carboxylating, chlorosulfonating, chlorophosphonating, chlorocarboxylating groups or agents that give a hydrogen sulfide group. More particularly these forms of carbon black are especially active in cross-linking the chlorosulfonated saturated hydrocarbons and especially those produced from the substituted solid polymers of ethylene containing from 20% to 45% by weight of chlorine and from 0.25% to 3.0% by weight of sulfur.

In addition to the substituted saturated hydrocarbon polymers described in the McQueen and McAlevy et al. patents supra, it has been found that other substituted hydrocarbon polymers are their equivalents, namely similarly substituted and especially chlorosulfonated: polyisobutylene; Fischer-Tropsch hydrocarbons; polymethylenes, hydrogenated diolefin polymers; hydrogenated diolefin - styrene interpolymers; hydrogenated rubber; alkyd resins; neoprene; hydrogenated polymers produced by the interaction of butadiene with xylene, toluene and similar aromatic hydrocarbons; and equivalent substituted saturated hydrocarbon polymers. Moreover, the curing and/or cross-linking agents are likewise useful for treating the following polymers which have been substituted in accord with the process of the McAlevy et al. patent: hydrogenated diolefin-acrylonitrile, -acrylates, -methacrylate interpolymers; polyacrylic and polymethacrylic acid esters; polyvinyl acetate; polyvinyl chloride; polyvinylidene chloride; and the like.

The process of the invention is conducted by mixing thoroughly the curing and/or cross-linking agent with the substituted polymer followed by subjecting the mixture to heat and pressure. Thorough incorporation of the curing and/or cross-linking agent into the substituted polymer is accomplished by passing the mixture through the rolls of a rubber mill or the agents may be mixed with the substituted polymer in a suitable machine, such as a Banbury mixer, and the resulting product subsequently heated and subjected to pressure for conversion to the cured elastomer. The agents are mixed with the substituted polymers in amounts ranging from 2 to 120 parts by weight of the cross-linking agent per 100 parts of the substituted polymer. The preferred amount of cross-linking agent used is between 10 and 60 parts by weight per 100 parts of the substituted polymer.

Compounding agents are added with the cross-linking agent if desired and for this purpose monobasic or polybasic acids of high molecular weight are used, such as stearic acid, palmitic acid, rosin and the like. Small amounts of antioxidants and/or accelerators can be used with advantage, such as diphenylguanidine, mercaptobenzothiazole, tetramethyl thiuramdisulfide, phenyl beta-naphthyl amine or high molecular weight phenolic antioxidants. These agents are used to give from 1 to 5% thereof, based on the weight of the substituted polymer. Fillers, pigments and other agents, such as barium sulfate, kaolin, diatomaceous earth, powdered talc, titanium dioxide, calcium sulfate and the like improve the products for certain purposes. Sulfur is used, if it is desired, to make the polymer more elastic and increase tensile strength, for which purpose 2.5 to 15 parts per 100 parts by weight of the substituted polymer are added. The substituted polymers, after the addition of cross-linking agents, whether or not they are compounded with the antioxidants, fillers and the like described above, are cured by heating at a temperature between 25 and 175° C. for a period preferably in the order of 10 to 120 minutes under a pressure of from 25 to 1500 lbs./sq. inch. Vulcanization, however, will take place at lower temperatures, pressures and longer rates, although, contrariwise, a fraction of a second in certain instances, for example when steam is present, is sufficient. Shaped articles can be produced by curing the compounded chlorosulfonated polymers directly in a mold having the desired shape.

The examples which follow illustrate preferred embodiments of the invention in which parts are by weight unless otherwise indicated.

ing of the polymer substantially constant from one run to the next. The resulting stock was then sheeted out, molded and press cured.

Examples 1 to 8 of the table illustrate the cross-linking ability of carbon blacks in the presence or in the absence of sulfur and addition agents on chlorosulfonated and on chlorinated polymers of ethylene. Barium sulfate, which is an inert material with no significant curing or cross-linking influence on the chlorosulfonated polymer of ethylene, is used in Example 1 for comparative purposes. The superiority of channel black over furnace black is seen from a comparison of the physical properties of Example 4 with those of Examples 2 and 3. Channel black is a better cross-linking agent than furnace black although for many purposes the products of Examples 2 and 3 are superior. The use of sulfur together with carbon black is illustrated by Examples 5 to 8, the amount of the carbon black used being but 25 parts while 160 parts were used in Examples 3 and 4. Good cures, however, were obtained by the process of Examples 5 and 7 in which no sulfur was present.

The polymeric elastomers produced in accord with the process of this invention are superior in many respects to vulcanized rubber and particularly in these important properties which include heat resistance, water resistance, abrasion resistance, resistance to oxidation, resistance to hydrocarbon oils, resistance to breakage by flexing, fatigue resistance and resistance to discoloration and organic instability. Moreover, the products produced with the curing an/or cross-linking agents hereinbefore described are likewise suitable for use in the art not only to replace, in many instances, rubber but also to provide products superior in many important respects to products made from rubber.

We claim:

1. A process for the preparation of cured elastomers which consists of heating a chlorosulfonated hydrocarbon polymer at a temperature between 25 and 175° C. and under a pressure up to 1500 lbs./sq. in. for from a fraction of a minute to 120 minutes in the presence of channel black.

*Table I*

| Example | Parts by Weight | | | | | | | |
|---|---|---|---|---|---|---|---|---|
| | 1 | 2 | 3 | 4 | 5 | 6 | 7 | 8 |
| Polymer [1] | 200 | 200 | 200 | 200 | 100 | 100 | 100 | 100 |
| BaSO$_4$ | 338 | | | | | | | |
| Furnace black | | 134 | 160 | | 25 | 25 | | |
| Channel black | | | | 160 | | | 25 | 25 |
| Tetrone A [2] | | | | | 2 | | | 2 |
| Staybelite resin [3] | | | 5 | | | 2 | | |
| Stearic acid | | | | | | 2 | | 2 |
| Sulfur | | | | | 2 | | 2 | |
| | | | | | 10 | 10 | 10 | 10 |
| Temperature, °C | 135 | 135 | 135 | 135 | 160 | 160 | 160 | 160 |
| Time (minutes) | 90 | 90 | 90 | 90 | 60 | 60 | 60 | 60 |

PHYSICAL PROPERTIES

| | | | | | | | | |
|---|---|---|---|---|---|---|---|---|
| Tensile p. s. i. (initial) | 200 | 415 | 665 | 1,640 | 1,425 | 625 | 1,275 | 1,600 |
| 100% modulus (initial) | 175 | 415 | 660 | 1,315 | 175 | 115 | 375 | 400 |
| Percent elongation (initial) | 460 | 275 | 200 | 165 | 385 | 665 | 415 | 275 |
| Percent residual elongation | 120 | 75 | −50 | 15 | 25 | 108 | 63 | 25 |

[1] Chlorosulfonated polymer of ethylene—27% Cl—1.9% S.
[2] Dipentamethylenethiuramtetrasulfide.
[3] Hercules Powder Co.—Hydrogenated wood rosin.

The procedure employed in carrying out the processes of the examples was to mill the polymer, filler and/or curing agents together on a 6 inch rubber mill, maintaining the volume load- 2. A process for the preparation of cured elastomers which consists of heating a chlorosulfonated normally solid polymer of ethylene at a temperature between 25 and 175° C. and under a pressure between 25 and 1500 lbs./sq. in. for from 10 to 120 minutes in the presence of channel black.

3. The process of claim 2 conducted in the presence of from 2 to 120 parts by weight of channel black per 100 parts of the polymer.

4. A process for the preparation of cured elastomers which consists in heating a chlorosulfonated normally solid polymer of ethylene containing from 20 to 45% by weight of chlorine and from 0.25 to 3.0% by weight of sulfur at a temperature between 25 and 175° C. and under a pressure up to 1500 lbs./sq. in. for from a fraction of a minute to 120 minutes in the presence of channel black.

5. The process of claim 4 conducted in the presence of from 2 to 120 parts by weight of channel black per 100 parts of the polymer.

ORRIN G. YOUNGQUIST.
MALCOLM A. SMOOK.
RICHARD E. BROOKS.

References Cited in the file of this patent

UNITED STATES PATENTS

| Number | Name | Date |
|---|---|---|
| 2,416,061 | McAlevy et al. | Feb. 18, 1947 |

OTHER REFERENCES

"Du Pont Rubber Chemicals," Report 43-1, pages 39 and 40, published by Rubber Chemicals Division of E. I. du Pont de Nemours & Co., Wilmington, Delaware, February 1943.